US010252620B2

(12) United States Patent
Francis

(10) Patent No.: US 10,252,620 B2
(45) Date of Patent: Apr. 9, 2019

(54) RANGE EXTENDING CHARGING SYSTEM FOR AN ELECTRIC VEHICLE

(71) Applicant: Newberry Francis, St. Louis, MO (US)

(72) Inventor: Newberry Francis, St. Louis, MO (US)

( * ) Notice: Subject to any disclaimer, the term of this patent is extended or adjusted under 35 U.S.C. 154(b) by 0 days.

(21) Appl. No.: 15/857,170

(22) Filed: Dec. 28, 2017

(65) Prior Publication Data

US 2018/0118036 A1   May 3, 2018

Related U.S. Application Data

(63) Continuation of application No. 15/416,849, filed on Jan. 26, 2017, now Pat. No. 9,884,558, which is a continuation-in-part of application No. 14/999,673, filed on May 10, 2016, now Pat. No. 9,809,117, and a continuation-in-part of application No. 14/544,371, filed on Dec. 30, 2014, now Pat. No. 9,744,864, which is a continuation-in-part of application No. 13/317,528, filed on Oct. 20, 2011, now Pat. No. 9,487,094.

(51) Int. Cl.
*B60K 25/08*   (2006.01)
*B60L 11/00*   (2006.01)
*B60L 11/18*   (2006.01)

(52) U.S. Cl.
CPC ............ *B60L 11/002* (2013.01); *B60K 25/08* (2013.01); *B60L 11/18* (2013.01); *B60Y 2300/91* (2013.01); *B60Y 2400/112* (2013.01)

(58) Field of Classification Search
CPC ...... B60L 11/002; B60L 11/12; B60L 11/123; B60L 11/18; B60L 11/1811–11/1812
See application file for complete search history.

(56) References Cited

U.S. PATENT DOCUMENTS

| | | |
|---|---|---|
| 3,556,239 A | 1/1971 | Spahn |
| 3,566,985 A | 3/1971 | Triplett |
| 8,561,744 B1 | 10/2013 | Belloso |
| 8,858,391 B2 | 10/2014 | Tolkacz et al. |
| 2013/0264129 A1* | 10/2013 | Knickerbocker ...... B60K 16/00 180/2.2 |
| 2103/0332014 | 12/2013 | Jackson |

* cited by examiner

*Primary Examiner* — Erez Gurari
(74) *Attorney, Agent, or Firm* — Lewis Rice LLC

(57) ABSTRACT

In an electric vehicle having a primary battery powered source of energy with a primary electric motor driven and connected to one or more ground engagement wheels of the electric vehicle, has a device utilizing a sprocket and chain for collecting energy from the inner rim edge of the rear wheel of the electric vehicle. This sprocket mechanism device collects this energy then transfers that energy to a plurality of alternators on mounted framework such as in the trunk compartment by way of a chain. The alternators with their sitting pilot voltages, then transfer it by electrically conductive cables to the battery.

1 Claim, 2 Drawing Sheets

RANGE EXTENDING CHARGING SYSTEM FOR AN ELECTRIC VEHICLE

CROSS REFERENCE TO RELATED APPLICATION(S)

This application is a Continuation of U.S. patent application Ser. No. 15/416,849, filed Jan. 26, 2017 and currently pending, which is a Continuation-in-Part (CIP) of U.S. patent application Ser. No. 14/999,673, filed May 10, 2016 and now U.S. Pat. No. 9,809,117 and is also a Continuation-in-Part (CIP) of U.S. Utility patent application Ser. No. 14/544,371, filed Dec. 30, 2014 and now U.S. Pat. No. 9,744,864, which is, in turn, a Continuation-in-Part (CIP) of U.S. Utility patent application Ser. No. 13/317,528, filed Oct. 20, 2011 and now U.S. Pat. No. 9,487,094. The entire disclosure of all the above documents is herein incorporated by reference.

BACKGROUND

1. Field of the Invention

The present invention relates to an auxiliary power transfer device for an electric vehicle and more particularly to an auxiliary mounted sprocket source device powered by one or more wheels of an electric vehicle.

2. Description of the Related Art

Electric and hybrid electric drive vehicles powered by batteries are well known and the electric vehicle whose drive systems are powered solely by battery sources are well known. Combining the multiple sources of energy to drive an electric vehicle has heretofore been deemed practical.

SUMMARY

In an electric vehicle having a primary battery powered source of energy with a primary electric motor driven and connected to one or more ground engagement wheels of the electric vehicle, there is provided a device utilizing a sprocket and chain for collecting energy from the inner rim edge of the rear wheel of the electric vehicle. This sprocket mechanism device collects energy from the rotation of the rear wheel and then transfers that energy to at least one, and generally a plurality of, alternators mounted on a framework such as in the trunk compartment by way of a chain. The alternators with their sitting pilot voltages, then transfer it by electrically conductive cables to the primary battery of the electric or hybrid electric vehicle.

In an embodiment, there is provided an electric vehicle comprising a primary electric motor powered by a primary battery bank source with electrical energy. The primary motor being driven and connected to one or more plurality of ground engagement wheels mounted on the electric vehicle; an auxiliary device driven and connected to one or more of the ground engagement wheels; a sprocket energy collecting device mounted on the electric vehicle for connecting to the wheels rotating energy; the sprocket energy collecting device included as an energy supply mechanism routing energy collected from the rear wheel inner rim edge.

The energy supply device, in an embodiment, comprises a battery bank source and an electrically conductive cable connected to the primary motor collecting device and delivering energy to one or more of the ground engagement wheels.

The energy supply device further comprises connections between the two alternator devices and receives energy from the wheel driven sprocket sending an electrically conductive cable to the battery bank source.

The primary battery bank source and the primary electric vehicle motor devices may alternately be driven and or connected electrically to a common ground engagement wheel.

The primary electric vehicle motor device typically includes an energy regenerator connected to the battery bank source while the energy regenerator is being driven and connected to the wheel which is driven and connected to a sprocket mechanism device mounted on the inner rim edge of the rear wheel and operating to regenerate energy for storage and usage in the battery bank source in response to the rotation of the connected and driven wheel. A modular gear box on the other hand consisting of several hard plastic and or metal gears is known as being capable of replacing the sprocket mechanism devices for space and strength are well known.

DESCRIPTION OF PREFERRED EMBODIMENT(S)

Figure 1:
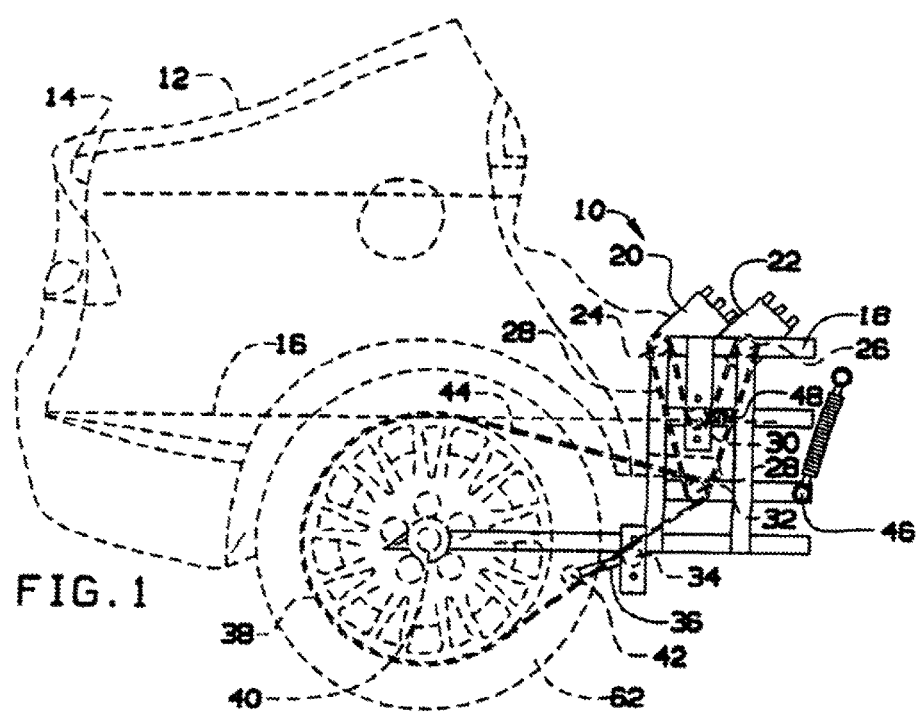
FIG. 1 illustrates an embodiment of a range extending charging system mounted in an exemplary vehicle.
Figure 3:
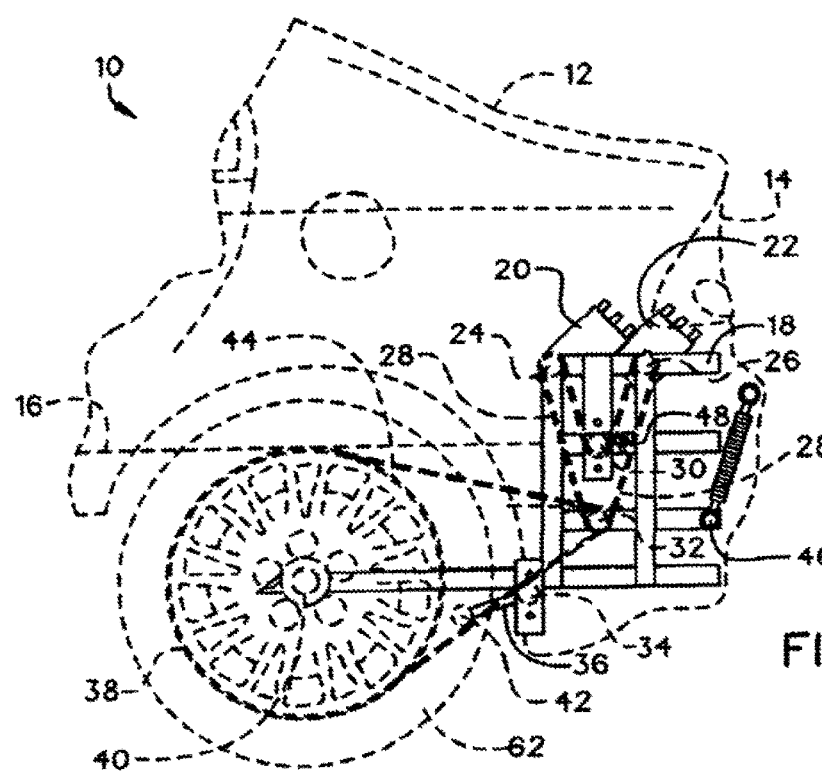
FIG. 3 illustrates another embodiment of a range extending charging system mounting the system in the opposing direction to that shown in FIG. 1.
Figure 2:
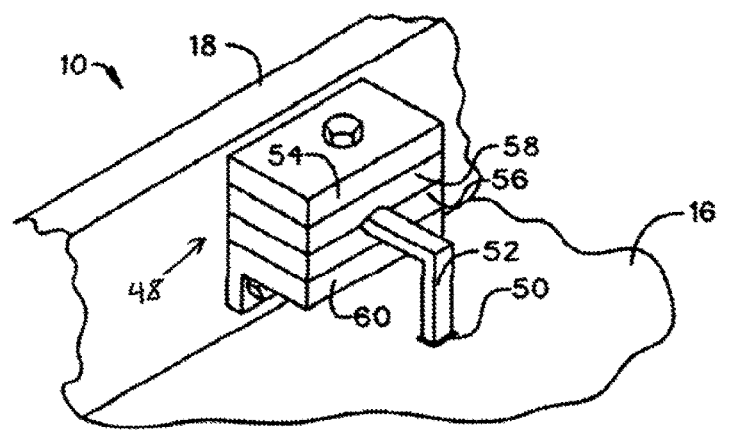
FIG. 2 illustrates an embodiment of a sway bar stabilizer mounted on the steel support frame to ensure the lateral balance of the steel support structure by placing the ninety-degree sway bar in a recessed hole featuring a metal keyway apparatus on the trunk floor of the vehicle that allows the sway bar to move freely up and down with the motions of the entire supporting structure.

It will be readily understood that the components of the present invention, as generally described and illustrated in the figures herein, could be arranged and designed in a wide variety of different configurations, thus, the following more detailed description of the embodiments of the system and method of the present invention and represented in FIGS. 1 through 3, are not intended to limit the scope of the invention, as claimed, but are merely representative of the presently preferred embodiment of the invention.

Further, the present systems and methods may be used on virtually any electric or hybrid electric vehicle which utilizes stored electricity as its primary source of energy. Generally, it is presumed herein that the stored electricity is stored in traditional chemical batteries, but that is by no means required and other electric storage systems may be used in alternative embodiments. Further, while FIGS. 1 and 3 depict the system positioned in an exemplary vehicle in the form of a traditional sedan, it should be recognized that the system can be used on any form of electric or electric hybrid vehicle including those of different body styles (for example, hatchbacks, station wagons, or coupes), non-car wheeled vehicles (for example, trucks, sport utility vehicles, motorcycles, motorized carts, ATVs, or recreational vehicles (RVs)), and on tracked vehicles or other vehicles which utilize a drive wheel and axle, but do not have wheels which engage the road surface (for example, bulldozers or tanks).

The presently preferred embodiments of the invention will be best understood by reference to the drawings wherein like parts are designated by like numerals throughout the features of this structure. The structure (10) generally comprises at least one and generally a plurality of alternators (20) and (22) (usually a pair), sprockets (38), (32), (30), (24), and (26), chains (44) and (28), connectors, a sway bar stabilizer (48), and a shock absorber (46) arranged on a mounting frame (18) so as to allow transfer rotational motion of the rear wheel (62) or rear axle (40) of a vehicle (12) to the alternators (20) and (22) where the rotational motion may be converted into electricity. Generally, the rear wheel is preferred as the mounting point as there is commonly space in a trunk or other rear position to place the device (10). However, this positioning is by no means required and the system may alternatively be mounted to other wheels or axles depending on the design of the related vehicle. The mounting frame (18) is generally a steel frame (18) with all equipment mounted thereon being generally either welded, anchored by bolts, or otherwise attached thereto. The frame (18) is then attached to the axle (40) so as to move with the motion of the axle (40) to maintain chain tension.

Generally, the system (10) will operate only when the electric or hybrid electric vehicle (12) moves forward. It works by using a sitting input voltage at the alternator windings coming from the battery circuits and ignition selector contact switch to the alternator, then outputs to the battery bank source provides a constant surge of regulated voltage and current flow as long as the vehicle (12) is operating in a forward motion. The system can also be particularly useful for reclaiming additional energy while the vehicle is braking or otherwise stopping. In particular, the system can reclaim electric energy from the rotation of the wheels (62) when the vehicle axle (40) is not being rotated by the onboard motor such as when the vehicle (12) is coasting or braking.

Turning now to the drawings, FIGS. 1 and 3 are perspective side views of an embodiment of a charging system (10) in a vehicle (12). The exemplary vehicle's trunk compartment (14) is illustrated to show the preferred location of the system (10) at the rear wheel (62). As can be seen from FIGS. 1 and 3, the illustrated embodiments provide for two different orientations of the system (10) either forward or rearward of the rear wheel (62).

FIGS. 1 and 3, illustrate the main primary steel structure and support frame (18) revealing all of the attachment positions of the various structures. The steel frame (18) will preferably either be bolted or welded to the rear wheel (62) assembly support structure in the vehicle to ensure that entire assembly (18) will preferably move up and down in unison at all times with the vehicle suspension system for smooth and uninterrupted operation and to maintain tension on the various chains (44) and (28). The charging system (10) preferably utilizes a sway bar stabilizer (48) as illustrated in greater detail in FIG. 2 affixed to the frame (18) for lateral balance relative the vehicle (12).

As should be apparent, the below discussion of the operation of FIG. 1 also provides for the operational discussion of the embodiment of FIG. 3 which is simply in a reversed position relative to the vehicle trunk compartment (14) to that of FIG. 1 to help illustrate that the positioning of the system (10) relative the vehicle (12) can be in a variety of fashions.

FIG. 1 illustrates the rear vehicle wheel (62) and rear vehicle axle (40) assembly equipped with the main drive sprocket (38) and the main chain (44) to drive the charging system (10).

FIG. 1 also illustrates the lower chain adjusting assembly consisting of one sprocket chain guide (42) and a chain adjusting flat sprocket (34) mounted on a guide sprocket arm (36). This lower chain adjusting assembly is generally used to tension and guide the main chain (44) during operation.

FIG. 1 illustrates the sprocket apparatus featuring the transfer sprocket (32) acting as a two chain (44) and (28) junction. This provides the main connecting points for a successful operation of the electric vehicle range extender charging system (10).

FIG. 1 illustrates the upper chain adjusting plate assembly consisting of one idler sprocket (30) mechanism that connects to both alternator sprockets (24) and (26) by the sprocket chain (28). As can be seen from the FIGS., the sprocket chain (28) is generally connected to the alternator sprockets (24) and (26) in a "V" pattern thus providing that a single chain (28) can drive both alternators (20) and (22).

FIG. 1, illustrates a first alternator (20) mounted on the steel support frame and support structure (18) with a first alternator sprocket (24) connected to a flat idler sprocket (30) on the upper adjusting chain plate assembly in concert with second alternator (22) and second alternator sprocket (26). First alternator (20) generally provides an electrical output connection to the vehicle's battery connection input, and the first alternator (20) input is received from the vehicle ignition selector switch battery output. A ground connection from the first alternator (20) may be connected to the ground point at the battery to safely ground the first alternator (20).

FIG. 1 also illustrates a second alternator (22) mounted on the steel support frame (18) with the second alternator sprocket (26) connected to a flat idler sprocket (30) on the upper adjusting chain plate assembly in concert with the first alternator (20) and first alternator sprocket (24). There is then a follow up connection to the dual secondary sprockets (30) and (32) as illustrated in FIG. 1. The second alternator (22) can also provide the electrical connection output to the vehicle battery connection input, and the second alternator (22) input may be received from the vehicle ignition selector switch battery output. Again, a ground connection from the second alternator (22) may be connected to a ground point at the battery.

As should be apparent from FIG. 1, it is generally preferred that the main drive sprocket (38) be substantially larger than the alternator sprockets (24) and (28). This allows for the alternator sprockets (24) and (28) to rotate multiple times for each rotation of the main drive sprocket (38) and therefore have the alternator sprocket (24) and (28) rotate much faster than the main drive sprocket (38). For efficiency, it is desired that frictional losses in the chains and sprockets in the system be minimized.

FIG. 1, illustrates the shock absorber (46) mounted at the end of the steel support frame (18) to assist in suppressing excessive vertical movement with concerns about the overall length and weight of the steel frame support structure (18).

FIG. 2, illustrates the sway bar stabilizer (48) mounted on the steel support frame (18) to ensure the lateral balance of the steel support structure (18) by placing the ninety-degree sway bar bracket (52) in a recessed hole (50) which comprises a metal keyway apparatus on the trunk floor (16) of the vehicle (12) that allows the sway bar stabilizer (48) to move freely up and down with the motions of the entire supporting structure (18).

FIG. 2 also illustrates the attachment of the bracket (52) to the steel frame (18) through the use of a sandwiched connection structure. The bottom metal base mating plate (60) is formed at a generally ninety-degree angle to attached to the structure (18). A top metal plate (54) is attached to the bottom metal plate (60) by a screw or bolt. Between the mating plates are a first rubber bushing (56) and a second rubber bushing (58) which are compressed around one end of the bracket (52).

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for charging an electric vehicle, the method comprising;
    providing a charging system comprising:
        a drive sprocket attached to an axle of an electric vehicle;
        a chain interconnecting said drive sprocket to a transfer sprocket;
        an alternator chain connecting said transfer sprocket to an alternator sprocket; and
        an alternator connected to said alternator sprocket; and
    said alternator generating electricity upon rotation of said drive sprocket.

* * * * *